(12) United States Patent
Kumar P R

(10) Patent No.: US 8,225,162 B2
(45) Date of Patent: Jul. 17, 2012

(54) METHOD AND APPARATUS FOR POWER CONTROL IN A WIRELESS COMMUNICATION SYSTEM

(75) Inventor: Ajit Kumar P R, Tamil Nadu (IN)

(73) Assignee: Motorola Mobility, Inc., Libertyville, IL (US)

( * ) Notice: Subject to any disclaimer, the term of this patent is extended or adjusted under 35 U.S.C. 154(b) by 995 days.

(21) Appl. No.: 12/198,397

(22) Filed: Aug. 26, 2008

(65) Prior Publication Data

US 2010/0058132 A1 Mar. 4, 2010

(51) Int. Cl.
G06F 11/00 (2006.01)
(52) U.S. Cl. ........................................ 714/748
(58) Field of Classification Search .................. 714/748
See application file for complete search history.

(56) References Cited

U.S. PATENT DOCUMENTS

| | | | |
|---|---|---|---|
| 6,904,021 B2 * | 6/2005 | Belcea | 370/252 |
| 2005/0043051 A1 * | 2/2005 | Takano et al. | 455/522 |
| 2005/0085197 A1 * | 4/2005 | Laroia et al. | 455/101 |
| 2005/0235190 A1 * | 10/2005 | Miyazaki et al. | 714/748 |
| 2007/0024559 A1 * | 2/2007 | Ahn et al. | 345/89 |
| 2007/0173275 A1 | 7/2007 | Das et al. | |
| 2009/0011786 A1 * | 1/2009 | Lee et al. | 455/522 |
| 2010/0265862 A1 * | 10/2010 | Choi et al. | 370/311 |
| 2011/0255439 A1 * | 10/2011 | Shirakabe et al. | 370/252 |

OTHER PUBLICATIONS

K. Knoche, et al., "HARQ Power Allocation Schemes for Power-Controlled Systems," Proceedings of the 14th IST Mobile & Wireless Communications Summit, Dresden, Cellular Systems II: CDMA Session, Jun. 19-23, 2005, 5 pages.

* cited by examiner

Primary Examiner — Bryce Bonzo

(57) ABSTRACT

A method and apparatus for power control of the re-transmission data packet in a wireless communication system is disclosed. A first wireless communication device is provided that receives (210) a data packet from a second wireless communication device and determines (220) if the data packet is correctly decoded. If the data packet is not correctly decoded, the first wireless communication device calculates (230) a first re-transmission power required for correctly decoding the data packet based on a signal to noise ratio (Eb/No) versus frame error rate (FER) relationship. And further calculates a power difference (240) between the calculated re-transmission power and the power of the received data packet and transmits the power difference (250) to the second wireless communication device. The second wireless communication device calculates (340) a second re-transmission power based on the received power difference and re-transmits (350) the data packet at the calculated re-transmission power.

17 Claims, 4 Drawing Sheets

METHOD AND APPARATUS FOR POWER CONTROL IN A WIRELESS COMMUNICATION SYSTEM

FIELD OF THE DISCLOSURE

The present disclosure relates generally to wireless communication systems, and more specifically to a method and apparatus for controlling power of a re-transmission data packet, in a wireless communication system.

BACKGROUND

In a wireless communication system, various wireless communication devices communicate with each other over the air interface using the radio links. When a wireless communication device transmits a data packet to another wireless communication device and the receiving wireless communication device is able to correctly decode the received data packet, then the receiving wireless communication device sends a positive acknowledgement (ACK) to the wireless communication device transmitting the data packet. An ACK denotes to the transmitting wireless communication device that the data packet was received and correctly decoded by the receiving wireless communication device and the transmitting wireless communication device does not need to re-transmit the packet data.

Otherwise, when the receiving wireless communication device is not able to correctly decode the data packet, it sends a negative acknowledgement (NACK) to the wireless communication device transmitting the data packet and implicitly asks the transmitting wireless communication device to re-transmit the data packet. A NACK denotes to the transmitting wireless communication device that the data packet was not correctly received and decoded by the receiving wireless communication device and the transmitting wireless communication device needs to re-transmit the data packet. In such a scenario, the transmitting wireless communication device re-transmits the data packet.

With the above ACK/NACK techniques, there is a very high possibility that the receiving wireless communication device is again not able to correctly decode the re-transmitted data packet, as the transmitting wireless communication device has no information about the power needed for the re-transmission of the data packet such that the re-transmitted data packet can be correctly decoded by the receiving wireless communication device. Transmission errors may be reduced by transmitting at higher power levels. On the other hand, transmission at higher power levels consumes base station capacity and may interfere with other transmissions.

As a result, recent Hybrid Automatic Repeat ReQuest (H-ARQ) schemes attempt to allocate transmission power for the re-transmission data packet. One such scheme is a Boosted scheme, where the re-transmission data packet is always and each time transmitted with increased power. However, this scheme can result in an excessive number of re-transmissions until an appropriate power level is attained and/or a waste of transmission power. This scheme also increases the reverse noise, subsequently, decreasing the number of wireless communication devices that can be served by a particular base station. Another scheme is De-Boosted and Super De-Boosted scheme, where the re-transmission data packet is every time transmitted with decreased power. However, this scheme, too, can increase the average number of re-transmissions. Different combinations of the above two scheme are also used, but none of the methods solves the problem of determining an optimal power for re-transmission by the transmitting wireless communication device for an error free reception and correct decoding of the re-transmitted data packet while minimizing a number of re-transmissions.

Accordingly, there is a need for a method and apparatus for power control for the re-transmission data packet, in a wireless communication system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
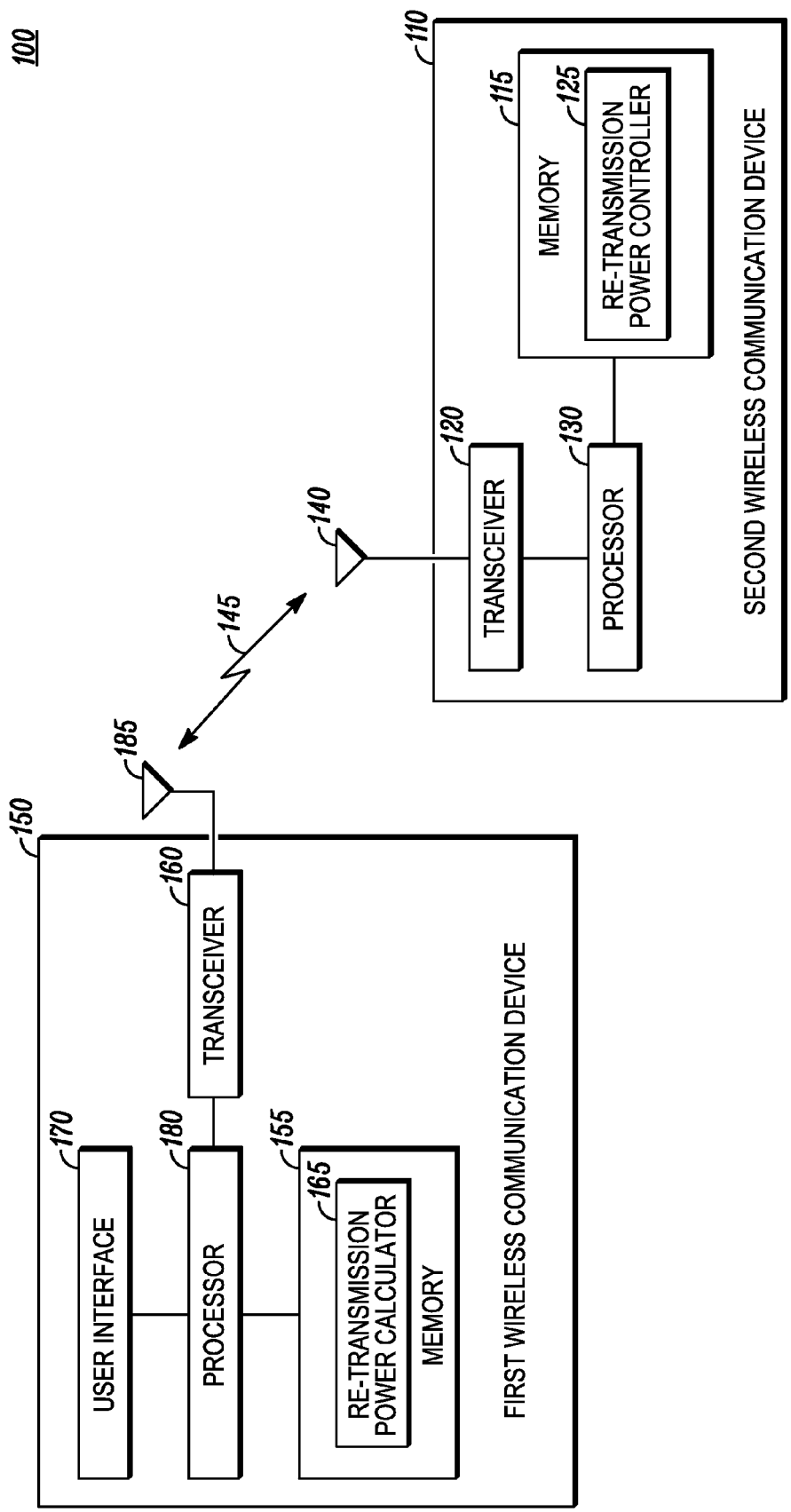
FIG. 1 is a block diagram of a first wireless communication device in communication with a second wireless communication device in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

To address the need for a method and apparatus for power control of the re-transmission data packet, a first wireless communication device is provided that receives a data packet from a second wireless communication device and determines if the data packet is correctly decoded. If the data packet is not correctly decoded, the first wireless communication device calculates a first re-transmission power required for correctly decoding the data packet based on a signal to noise ratio (Eb/No) versus frame error rate (FER) relationship. The first wireless communication device further calculates a power difference between the calculated first re-transmission power and the power of the received data packet and transmits the power difference to the second wireless communication device. In response to receiving the power difference from the first wireless communication device, the second wireless communication device calculates a second re-transmission power required for correctly transmitting the data packet based on the received power difference and re-transmits the data packet at the calculated second re-transmission power. The second re-transmission power is based on the power difference, which in turn is calculated based on the first re-transmission power. As a result, the second re-transmission power is indirectly based on the first re-transmission power. In one example, the second re-transmission power is equal to the first re-transmission power. This ensures error free reception and correct decoding of the re-transmitted data packet by the first wireless communication device.

FIG. 1 is a block diagram 100 of a first wireless communication device 150, preferably a mobile station, in communication with a second wireless communication device 110, preferably a base station, in accordance with an embodiment of the present invention. The wireless communication device 150 includes a user interface 170, an antenna 185, a transceiver 160, a processor 180, and a memory 155 that maintains programs/instructions for implementing a re-transmission power calculator 165. The re-transmission power calculator 165 is maintained by the memory 155 and is implemented by the processor 180. The user interface 170, for example, can include a microphone, an audio speaker, a display, a keyboard, and so on. The transceiver 160 includes a receiver and a transmitter for receiving and transmitting signals through the antenna 185.

The memory 155 stores a signal to noise ratio (Eb/No) versus frame error rate (FER) relationship for various modulation schemes and coding schemes. In various embodiments of the present invention, the Eb/No versus FER relationship may be stored in memory 155 in the form of a curve, a table, an algorithm, or an equation. In one example, the Eb/No versus FER relationship may be pre-stored in the wireless communication device 150. In another example, the Eb/No versus FER relationship is generated using simulations in the wireless communication device 150 for various modulation techniques and coding schemes. In yet another example, the Eb/No versus FER relationship is received by the wireless communication device from the base station 110. In still another example, some of the Eb/No versus FER relationships are pre-stored in the wireless communication device 150 and some of the Eb/No versus FER relationships are received from the base station 110. An example of a possible Eb/No versus FER relationship is shown as the curve 400 in FIG. 4 and will be explained later with reference to FIG. 4.

Based on the Eb/No versus FER relationship, the re-transmission power calculator 165 calculates the first re-transmission power required for correctly decoding the data packet and further calculates a power difference between the calculated re-transmission power and the power of the received data packet, if the data packet is not correctly decoded by the wireless communication device 150.

The wireless communication device 150 communicates with the wireless communication device 110 using the radio link 145. The wireless communication device 110 includes an antenna 140, a transceiver 120, a processor 130, and a memory 115 that maintains programs/instructions for implementing a re-transmission power controller 125. Similar to the re-transmission power calculator 165, the re-transmission power controller 125 also is implemented by its corresponding processor 130 and maintained by its corresponding memory 115. The transceiver 120 includes a receiver and a transmitter for receiving and transmitting signals through the antenna 140. The re-transmission power controller 125 calculates a second re-transmission power required for re-transmitting the data packet based on a received power difference.

In one embodiment of the present invention, the transceiver 160, and in particular the receiver, of the wireless communication device 150 receives a data packet transmitted by the transmitter 120 of the base station 110. If the wireless communication device 150 is not able to decode the data packet correctly, the re-transmission power calculator 165 calculates the first re-transmission power in association with a target signal quality, preferably a re-transmission power that will result in a desired FER. More particularly, the re-transmission power calculator 165 calculates a re-transmission power required for correctly decoding the data packet based on the Eb/No versus FER relationship stored in the memory 155 of the wireless communication device 150. The re-transmission power calculator 165 further calculates a power difference between the calculated re-transmission power and the power of the received data packet. Subsequently, the transceiver 160, and in particular the transmitter, of the wireless communication device 150 transmits the power difference to the wireless communication device 110. The transceiver 120, and in particular the receiver, of the wireless communication device 110 receives the power difference and communicates it to the processor 130. Based on the received power difference, the re-transmission power controller 125 of the wireless communication device 110 calculates a second re-transmission power required for re-transmitting the data packet. The transceiver 120, and in particular the transmitter, of the wireless communication device 110 then re-transmits the data packet with the calculated second re-transmission power such that the re-transmitted data packet can be correctly decoded by the wireless communication device 150.

Figure 2:
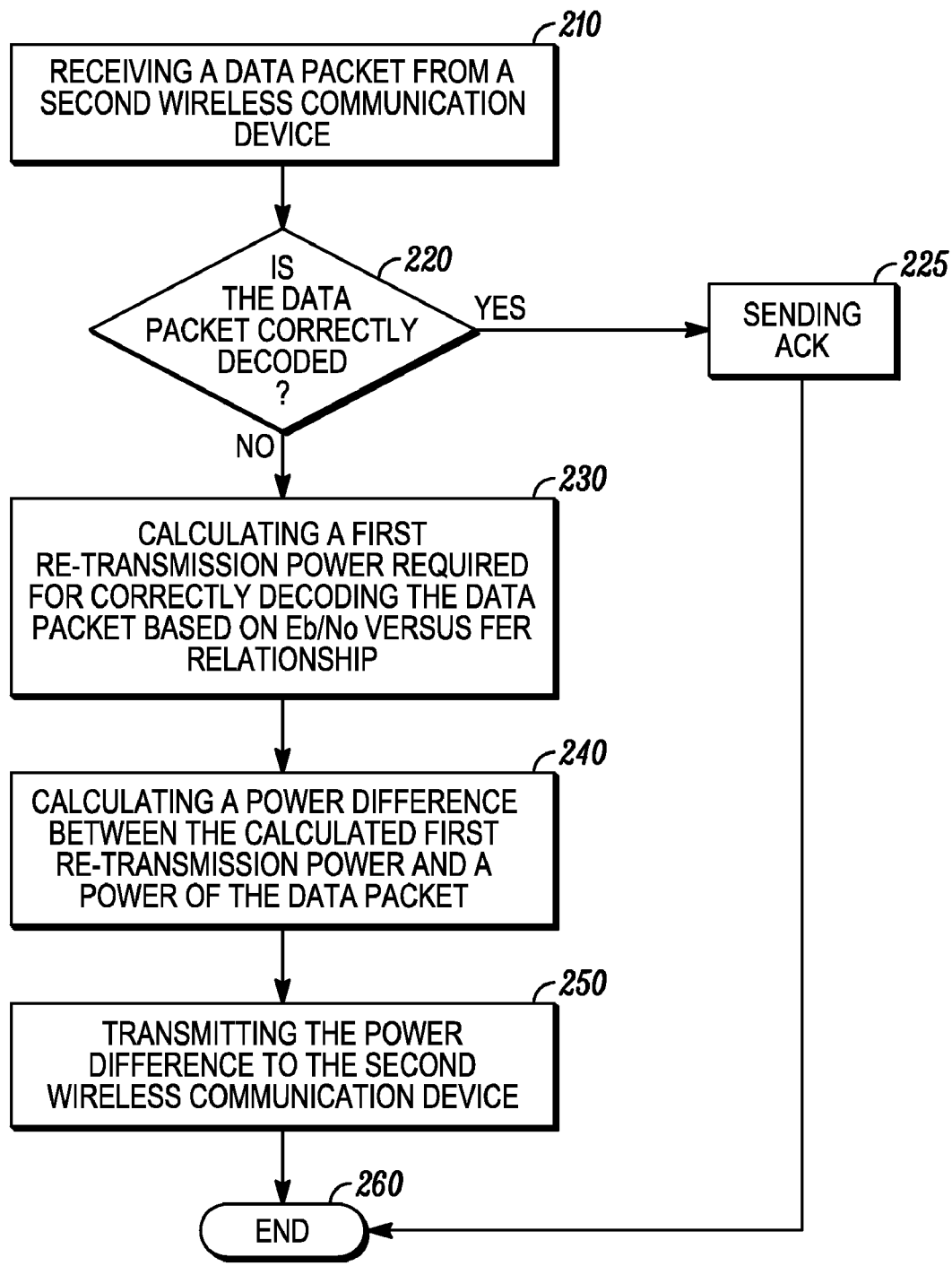
FIG. 2 is a flowchart of a method for a first wireless communication device to calculate a re-transmission power required for correctly decoding a data packet in accordance with an embodiment of the present invention.

FIG. 2 is a flowchart 200 depicting a method by which the first wireless communication device 150 calculates a first re-transmission power required for correctly decoding a data packet in accordance with an embodiment of the present invention. The first wireless communication device 150 receives 210 a data packet from a second wireless communication device, such as second wireless communication device 110, and tries to decode the received data packet. Then, the first wireless communication device 150 determines 220 if the data packet is correctly decoded. If the data packet is correctly decoded, the first wireless communication device 150 sends 225 an acknowledgement (ACK) to the second wireless communication device 110 and the process ends 260.

Otherwise, if the data packet is not correctly decoded, the first wireless communication device 150 calculates 230 a first re-transmission power for correctly decoding the data packet based on Eb/No versus FER relationship. The first wireless communication device 150 may further calculate the re-transmission power associated with a target signal quality of the data packet. The method of calculating the re-transmission power will be explained in detail with reference to FIG. 4.

Further, the first wireless communication device 150 calculates 240 a power difference between the calculated first re-transmission power and a power of the received data packet. The first wireless communication device 150 then transmits 250 the power difference to the second wireless communication device 110 and the process ends 260. In another embodiment of the present invention, the first wireless communication device 150 may transmit the power difference to the second wireless communication device 110 along with a negative acknowledgement (NACK) response.

Figure 3:
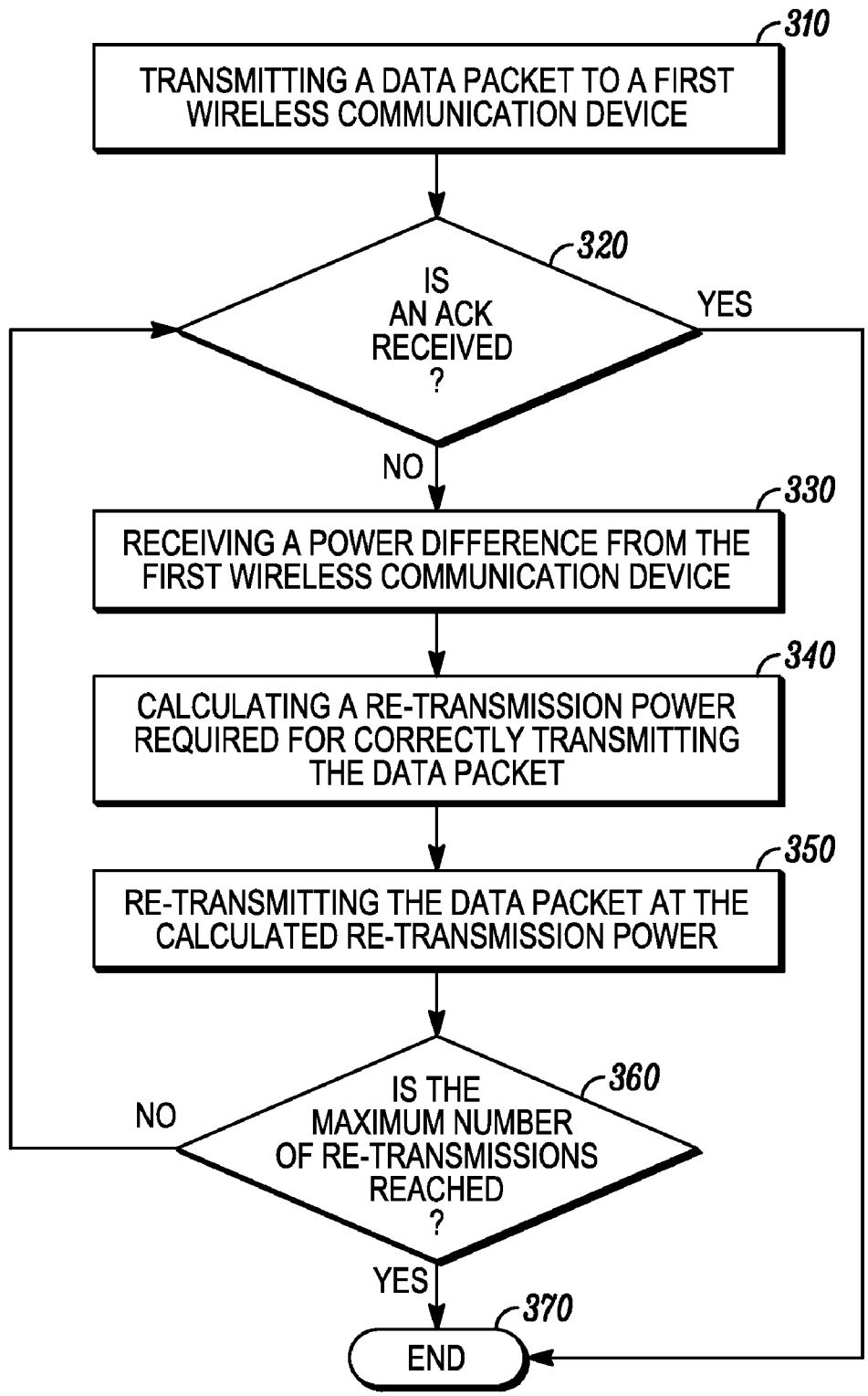
FIG. 3 is a flowchart of a method for a second wireless communication device to calculate a re-transmission power required for correctly transmitting the data packet in accordance with an embodiment of the present invention.

FIG. 3 is a flowchart 300 depicting a method by which the second wireless communication device 110 calculates a re-transmission power required for correctly transmitting the data packet in accordance with an embodiment of the present invention. The second wireless communication device 110 transmits 310 a data packet to a first wireless communication device 150. Then the second wireless communication device 110 determines 320 if an ACK corresponding to the transmitted data packet is received. In the event that an ACK is received, the process ends 370. Otherwise, if an ACK is not received, the second wireless communication device 110 receives 330 a power difference from the first wireless communication device. As explained above, the power difference is the difference between the first re-transmission power calculated by the first wireless communication device 150 for correctly the data packet and the power of the data packet received by the first wireless communication device.

In response to receiving the power difference, the second wireless communication device 110 calculates 340 a second re-transmission power required for correctly transmitting the data packet based on the received power difference. In one example, the second re-transmission power is calculated by adding the received power difference to the power of the transmitted data packet (for example, the power at which the data packet was initially transmitted).

After calculating the second re-transmission power, the second wireless communication device 110 re-transmits 350 the data packet at the calculated re-transmission power. Then, the second wireless communication device 110 determines 360 if a maximum number of retransmissions for a particular data packet have been reached. If the maximum number of retransmissions has been reached, the process ends 370. Otherwise, if the maximum number of retransmissions has not been reached, the second wireless communication device 110 again determines 320 if an ACK for the re-transmitted data packet is received. The second wireless communication device 110 keeps repeating the steps of determining 320, receiving 330, calculating 340, re-transmitting 350, and determining 360 until an ACK is received for a transmitted or re-transmitted data packet or the maximum number of retransmissions for a particular data packet is reached.

Figure 4:
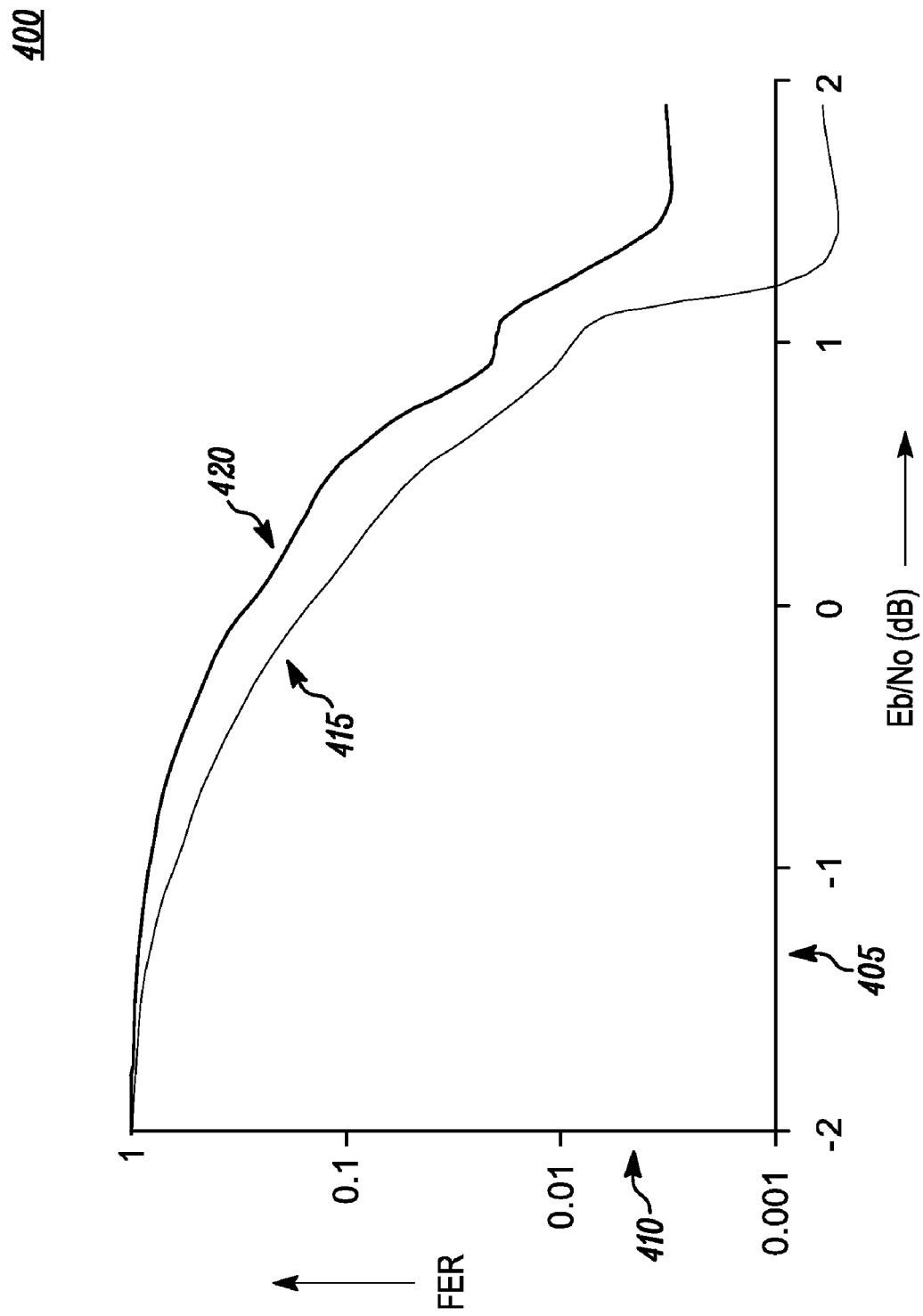
FIG. 4 is a graph of a signal to noise ratio (Eb/No) versus frame error rate (FER) relationship in accordance with an embodiment of the present invention.

FIG. 4 is a graph 400 of an exemplary signal to noise ratio (Eb/No) versus frame error rate (FER) relationship. The vertical axis 405 corresponds to a signal to noise ratio (Eb/No) that is represented in decibels (dB). The horizontal axis 410 corresponds to a Frame Erasure/Error Rate (FER) that is a measure of the number of frames of data that contained errors and could not be processed. FER is usually expressed as a percentage or exponent. In one example, the FER for correctly decoding a data packet is 1% or 0.01.

FIG. 4 shows Eb/No versus FER curves 415, 420 for an EV-DO wireless communication system, when a wireless communication device, such as wireless communication device 150, is moving at a speed of 3 km/hr. A first Eb/No versus FER curve 415 of the two curves 415, 420 shows the Eb/No versus FER relationship for a first transmission of a data packet and a second Eb/No versus FER curve 420 of the two curves 415, 420 shows the Eb/No versus FER relationship for a re-transmission of the data packet.

The wireless communication device knows the number of bits received in the data packet and the energy received in the data channel. As a result, the wireless communication device calculates the received bit energy (Eb) and the noise energy (No) associated with the received packet. Then the wireless communication device divides the calculated Eb by the computed noise (No) to calculate the signal to noise ratio (Eb/No). After calculating Eb/No, the wireless communication device determines the corresponding frame erasure rate (FER) by reference to the curve 415 maintained in a memory of the device. In other embodiments of the present invention, the wireless communication device may determine the FER by reference to an algorithm or look up table maintained in a memory of the device.

For example and based on the curves depicted in FIG. 4, suppose the wireless communication device receives a data packet from another wireless communication device, for example, wireless communication device 110, and calculates the Eb/No (also referred to as a power of the received data packet) to be 0.3 dB. After calculating Eb/No, the wireless communication device looks up the first curve 415. Based on the curve 415, the wireless communication device determines the required Eb/No for 0.01 FER for the first transmission of the data packet to be around 1.2 dB. Therefore, the wireless communication device cannot decode the data packet correctly, since the Eb/No for the received data packet is 0.3 dB.

Now the wireless communication device computes the required Eb/No for the re-transmission of the data packet by the base station, for receiving the packet with 0.01 FER using the second curve 420. Based on the second curve, the wireless communication device computes that the Eb/No required is around 1 dB for correctly decoding the re-transmitted data packet.

Further suppose that when the wireless communication device soft-combines the received re-transmitted data packet with the first received data packet, the wireless communication device requires the re-transmitted packet to be sent with the transmission power that is equal to the difference between the power level (1.0 dB) that is required to decode the packet correctly and the power level (0.3 dB) at which the first data packet was received. Therefore, the wireless communication device requires power level of the re-transmission packet to be 0.7 dB (1 dB-0.3 dB) to decode the re-transmission packet correctly by soft combining it with the first data packet that was received at a power level of 0.3 dB. Since this Eb/No value (0.7 dB) is 0.4 dB higher than the Eb/No of the first received data packet (0.3 dB), the wireless communication device transmits the power difference (0.4 dB) to the base station to adjust its re-transmission power. In response to receiving the power difference, the base station calculates the re-transmission power required for correctly transmitting the data packet based on the received power difference and re-transmits the data packet at the calculated re-transmission power.

This method of using Eb/No versus FER relationship for calculating the exact power required for correctly decoding the re-transmission data packet and transmitting it to the transmitting wireless communication device helps to reduce the wastage of power as in HARQ Boosted scheme as well as reduces the number of re-transmissions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method for power control by a first wireless communication device, the method comprising:
   receiving a data packet from a second wireless communication device;
   determining if the data packet is correctly decoded;
   if the data packet is not correctly decoded, calculating a first re-transmission power required for correctly decoding the data packet based on a signal to noise ratio (Eb/No) versus frame error rate (FER) relationship;
   calculating a power difference between the calculated first re-transmission power and a power of the data packet; and
   transmitting the power difference to the second wireless communication device.

2. The method of claim 1 further comprising, if the data packet is correctly decoded, transmitting an ACK.

3. The method of claim 1, wherein calculating a first re-transmission power comprises calculating a first re-transmission power associated with a target signal quality.

4. The method of claim 1, wherein the Eb/No versus FER relationship is stored in form of at least a curve, a table, an algorithm, or an equation.

5. The method of claim 1, wherein the Eb/No versus FER relationship is pre-stored in the first wireless communication device.

6. The method of claim 1, wherein the Eb/No versus FER relationship is generated using simulations in the first wireless communication device for at least one modulation technique and at least one coding scheme.

7. The method of claim 1, wherein the Eb/No versus FER relationship is received by the first wireless communication device from a base station.

8. The method of claim 1, wherein transmitting further comprises:
   sending the power difference along with a response NACK.

9. The method of claim 1 further comprising:
   receiving, by the second wireless communication device, the power difference;
   calculating, by the second wireless communication device, a second re-transmission power required for correctly transmitting the data packet based on the received power difference; and
   re-transmitting, by the second wireless communication device, the data packet at the calculated re-transmission power.

10. The method of claim 9, wherein the first re-transmission power is equal to the second re-transmission power.

11. The method of claim 10 further comprising:
    receiving a re-transmission of the data packet from the second wireless communication device at the second re-transmission power.

12. A method for re-transmitting data by a wireless communication device, the method comprising:
    transmitting a data packet to another wireless communication device;
    determining if an ACK is received for the data packet;
    if the ACK is not received for the data packet, receiving a power difference from the another wireless communication device;
    calculating a re-transmission power required for correctly transmitting the data packet based on the received power difference; and re-transmitting the data packet at the calculated re-transmission power.

13. The method of claim 12, wherein the power difference is received along with a response NACK.

14. The method of claim 12, wherein calculating further comprises:
adding the power difference to a power of the data packet, wherein the power of the data packet is the power at which the data packet was transmitted.

15. A wireless communication device comprising:
a receiver for receiving a data packet from another wireless communication device;
a re-transmission power calculator for calculating, when the data packet is not correctly decoded, a re-transmission power required for correctly decoding the data packet based on a signal to noise ratio (Eb/No) versus frame error rate (FER) relationship and for calculating a power difference between the calculated re-transmission power and a power of the data packet; and
a transmitter for transmitting the power difference to the another wireless communication device.

16. The wireless communication device of claim 15 further comprising:
a memory for storing the Eb/No versus FER relationship for at least one modulation scheme and at least one coding scheme.

17. A wireless communication device comprising:
a transmitter for transmitting a data packet to another wireless communication device;
a receiver for receiving a power difference from the another wireless communication device; and
a re-transmission power controller for calculating a re-transmission power required for re-transmitting the data packet based on the received power difference.

\* \* \* \* \*